(12) United States Patent
Muramatsu

(10) Patent No.: US 9,649,698 B2
(45) Date of Patent: May 16, 2017

(54) TOOL CLAMPING DEVICE

(71) Applicant: FANUC Corporation, Yamanashi (JP)

(72) Inventor: Toshifumi Muramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 83 days.

(21) Appl. No.: 14/313,048

(22) Filed: Jun. 24, 2014

(65) Prior Publication Data

US 2015/0003929 A1      Jan. 1, 2015

(30) Foreign Application Priority Data

Jun. 26, 2013   (JP) .................................. 2013-133898

(51) Int. Cl.
  *B23B 31/107*   (2006.01)
  *B23B 31/26*   (2006.01)
(52) U.S. Cl.
  CPC .......... *B23B 31/263* (2013.01); *B23B 31/261* (2013.01); *B23B 2260/034* (2013.01); *Y10T 408/94* (2015.01); *Y10T 408/95* (2015.01); *Y10T 409/309296* (2015.01); *Y10T 409/309464* (2015.01)
(58) Field of Classification Search
  CPC ............... B23B 31/261; B23B 31/263; B23B 2260/034; Y10T 408/94; Y10T 408/95; Y10T 408/957; Y10T 409/309296; Y10T 409/309352; Y10T 409/309408; Y10T 409/309464; Y10T 409/30952
  USPC ........ 409/230, 231, 232, 233, 234; 408/238, 408/239 R, 239 A; 74/110; 269/136
  See application file for complete search history.

(56) References Cited

U.S. PATENT DOCUMENTS

| | | | | | |
|---|---|---|---|---|---|
| 3,684,303 | A | * | 8/1972 | Serra ....................... | B23B 31/26 279/82 |
| 4,604,012 | A | * | 8/1986 | Kawasaki ............. | B23B 31/263 279/82 |
| 4,628,586 | A | * | 12/1986 | Yoshimi ................ | B23B 31/263 409/233 |
| 5,018,916 | A | * | 5/1991 | Bauch ................... | B23B 31/261 279/4.06 |

(Continued)

FOREIGN PATENT DOCUMENTS

| | | |
|---|---|---|
| CN | 1205929 A | 1/1999 |
| CN | 101000283 A | 7/2007 |

(Continued)

OTHER PUBLICATIONS

Office Action mailed Nov. 18, 2014, corresponding to Japanese patent application No. 2013-133898.

(Continued)

*Primary Examiner* — Daniel Howell
*Assistant Examiner* — Yasir Diab
(74) *Attorney, Agent, or Firm* — Hauptman Ham, LLP

(57) ABSTRACT

According to a tool clamping device for a machine tool, when a draw bar is moved in the axial direction of the main shaft of the tool clamping device, a steel ball moves in the radial direction of the main shaft so as to press the inner wall of the main shaft, forming an impression on the inner wall of the main shaft. This forms an inclined surface for generating a magnification effect for magnifying a spring force.

6 Claims, 5 Drawing Sheets

(56) References Cited

U.S. PATENT DOCUMENTS

| | | | | |
|---|---|---|---|---|
| 5,022,278 | A | * | 6/1991 | DeCaussin .............. B23B 31/26 |
| | | | | 279/51 |
| 5,626,448 | A | * | 5/1997 | Huang .................. B23B 31/263 |
| | | | | 409/230 |
| 5,662,442 | A | * | 9/1997 | Taki ...................... B23B 31/261 |
| | | | | 408/239 R |
| 5,997,455 | A | | 12/1999 | Matsuoka et al. |
| 6,722,827 | B1 | * | 4/2004 | Anderson ............ B23B 31/261 |
| | | | | 408/239 R |
| 2010/0196113 | A1 | * | 8/2010 | Erickson ................ B23B 31/06 |
| | | | | 408/239 R |
| 2010/0308524 | A1 | | 12/2010 | Kitaura et al. |

FOREIGN PATENT DOCUMENTS

| CN | 101497168 A | 8/2009 |
|---|---|---|
| CN | 101925439 A | 12/2010 |
| CN | 102001011 A | 4/2011 |
| JP | 53-22859 A | 3/1978 |
| JP | 54-164981 U | 11/1979 |
| JP | 60-67829 U | 5/1985 |
| JP | H01-205905 A | 8/1989 |
| JP | H02-104906 U | 8/1990 |

OTHER PUBLICATIONS

Office Action in CN Application No. 201410300206.6, dated Jan. 6, 2016.

* cited by examiner

TOOL CLAMPING DEVICE

RELATED APPLICATIONS

The present application claims priority to Japanese Application No. 2013-133898, filed Jun. 26, 2013, the disclosure of which is hereby incorporated by reference herein in its entirety.

BACKGROUND OF THE INVENTION

1. Field of the Invention

The present invention relates to a tool clamping device used for a machine tool.

2. Description of the Related Art

A tool clamping device used for a machine tool, particularly a machining center, needs to generate a predetermined force for clamping a tool. However, the generation of such a force only by a spring may increase the size of the tool clamping device. In order to avoid a size increase of the tool clamping device, the tool clamping device includes a mechanism for magnifying a spring force.

FIG. 1 is an overall schematic diagram of the tool clamping device. A main shaft 1 contains a draw bar 3 inserted via a spring 2. Reference numeral 6 denotes a tool holder.

FIG. 5 is an enlarged view showing a part A of FIG. 1. A concave portion 9 is formed on the end of the draw bar 3 while a pull stud 7 is fit into the concave portion 9. Furthermore, a guide hole 10 is provided on a cylindrical part 4 of the draw bar 3. Steel balls 5 are fit into the guide hole 10. Moreover, an inclined surface 12 is provided on the pull stud 7 in contact with the steel balls 5 while an inclined surface 11 is provided on the inner surface of the main shaft 1 so as to be substantially opposed to the inclined surface 12 provided on the pull stud 7 with the steel balls 5 interposed between the inclined surfaces 11 and 12. Reference numeral 8 denotes a main-shaft inner wall surface.

With this configuration, when the draw bar 3 and the pull stud 7 are lifted by a force of the spring 2, a reaction force is generated by the spring 2 between the steel ball 5 and the inclined surface 12 of the pull stud 7 and between the steel ball 5 and the inclined surface 11 of the main shaft 1, whereupon a magnification effect that magnifies the force of the spring 2 is generated.

Japanese Utility Model Application Laid-Open No. 2-104906 discloses a tool holding device that includes a tapered sleeve on the opposite side of a lead-in bar provided with a tool clamping mechanism. The tool holding device includes a magnification mechanism composed of the tapered sleeve, steel balls, and an inclined surface provided on a main shaft.

Japanese Patent Application Laid-Open No. 1-205905 discloses a tool clamping mechanism in which a magnification mechanism has an inclined surface on a pull stud provided in a tool holder, steel balls on a draw bar, and an inclined surface provided on a main shaft.

In any of prior art techniques illustrated in FIG. 5 and disclosed in Japanese Utility Model Application Laid-Open No. 2-104906 and Japanese Patent Application Laid-Open No. 1-205905 described above, the magnification mechanism has the inclined surface on the inner wall surface of the main shaft. The inclined surface is formed by cutting or the like during the manufacturing of the main shaft. Thus, the manufacturing of the tool clamping device requires working for forming the inclined surface on the inner wall surface of the main shaft. This may increase the number of man-hours required for working, increasing the manufacturing cost of the tool clamping device.

SUMMARY OF THE INVENTION

An object of the present invention is to provide a tool clamping device that can be inexpensively manufactured with a magnification mechanism.

A tool clamping device for a machine tool according to the present invention includes: a main shaft; a spring provided in the main shaft; a draw bar that is inserted into the main shaft so as to be opposed to the main shaft with the spring interposed between the main shaft and the draw bar, is provided with a concave portion on the end of the draw bar, and is movable in an axial direction of the main shaft; and a steel ball that is provided around the end of the draw bar so as to move in the radial direction of the main shaft in response to a movement of the draw bar, the tool clamping device having an impression on the inner wall of the main shaft, at a position where the steel ball moves inward and outward.

The impression may be formed on the inner wall of the main shaft by inserting a cylindrical or prismatic jig that has a predetermined diameter in a concave portion of the draw bar and then pressing the steel ball by the inserted cylindrical or prismatic jig onto the inner wall of the main shaft.

An impression forming jig that includes a jig body having a hollow part and a penetrator provided on an end of the jig body may be inserted in the main shaft, and the impression may be formed on the inner wall of the main shaft by inserting a cylindrical or prismatic jig in the hollow part of the impression forming jig so that a penetrator of the impression forming jig is pressed onto the inner wall of the main shaft.

The present invention can provide a tool clamping device that can be inexpensively manufactured with a magnification mechanism.

BRIEF DESCRIPTION OF THE DRAWINGS

The above and other objects and features of the present invention will be apparent from the following description of the preferred embodiments of the invention in conjunction with the accompanying drawings, in which.

DETAILED DESCRIPTION OF THE PREFERRED EMBODIMENTS

Figure 1:
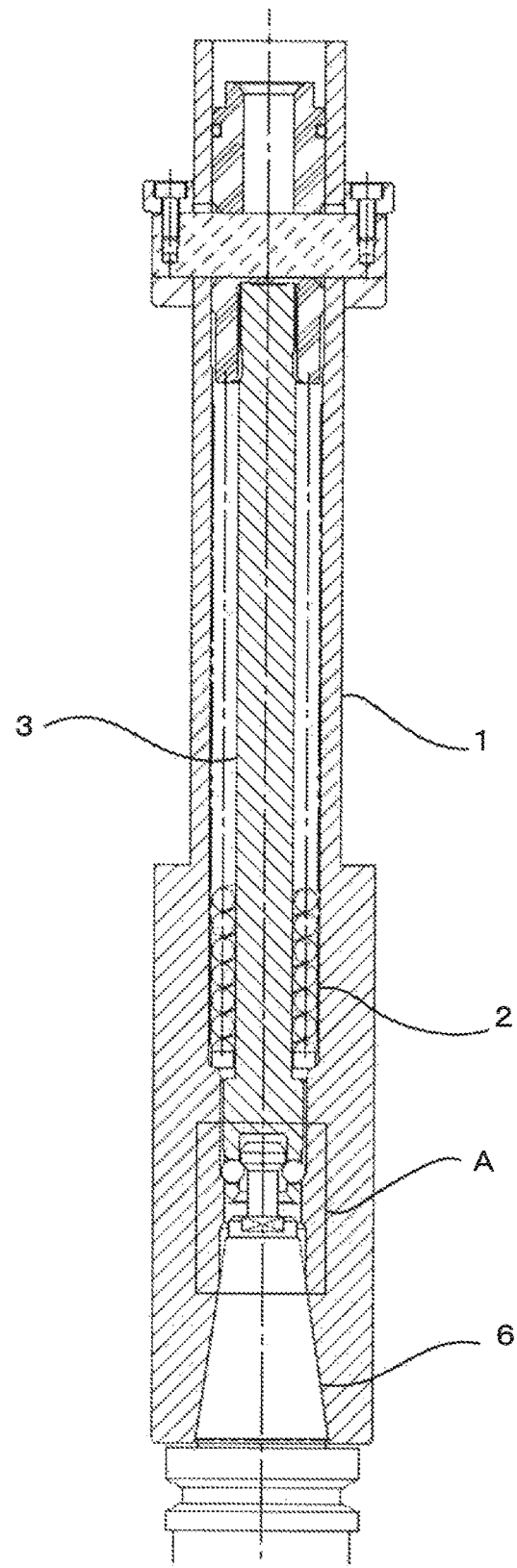
FIG. 1 is an overall schematic diagram of a tool clamping device.
Figure 2:
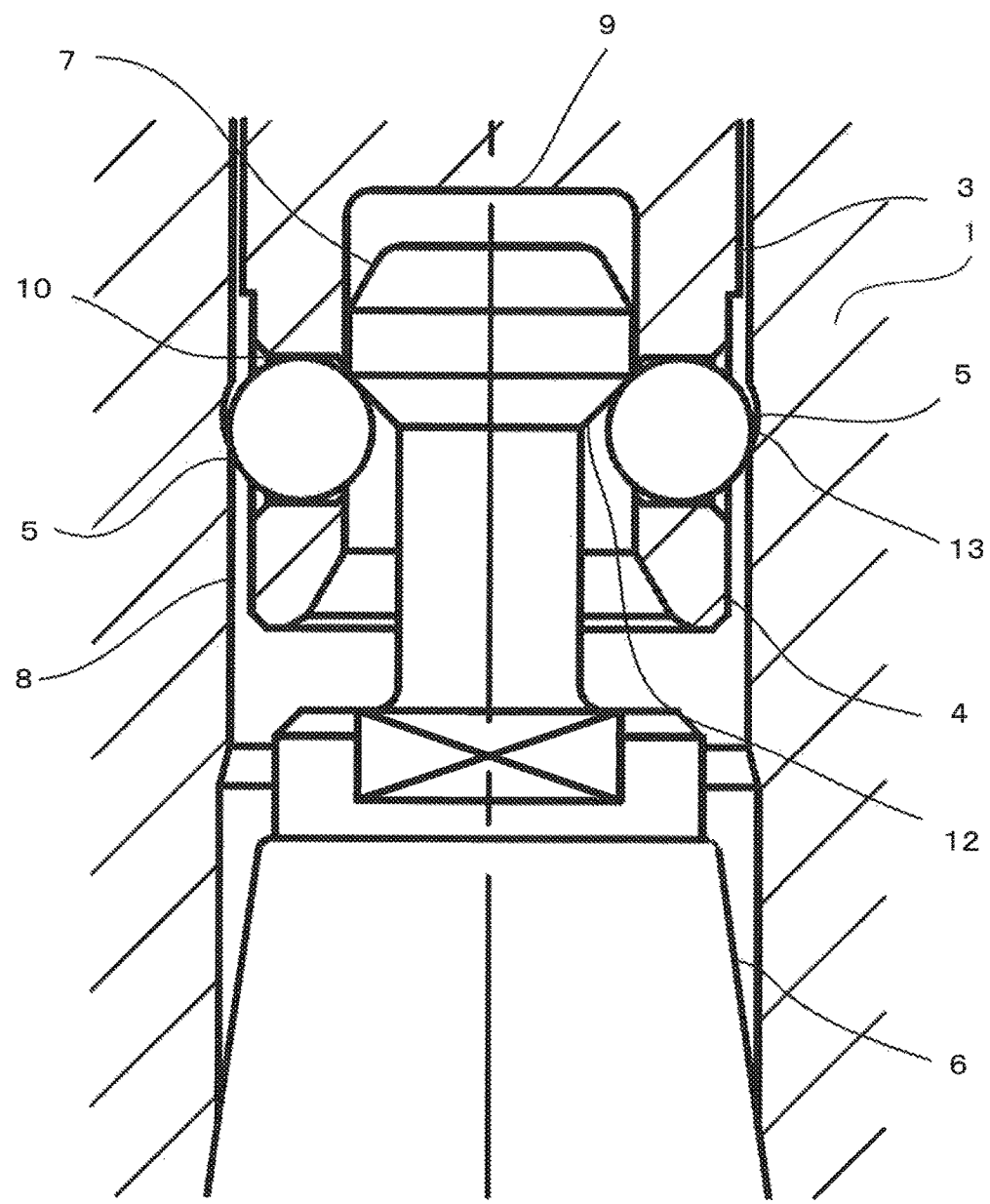
FIG. 2 is an enlarged view of the tool clamping device according to the present invention, in which an inclined surface is formed by an impression on the inner wall surface of a main shaft.
Figure 3:
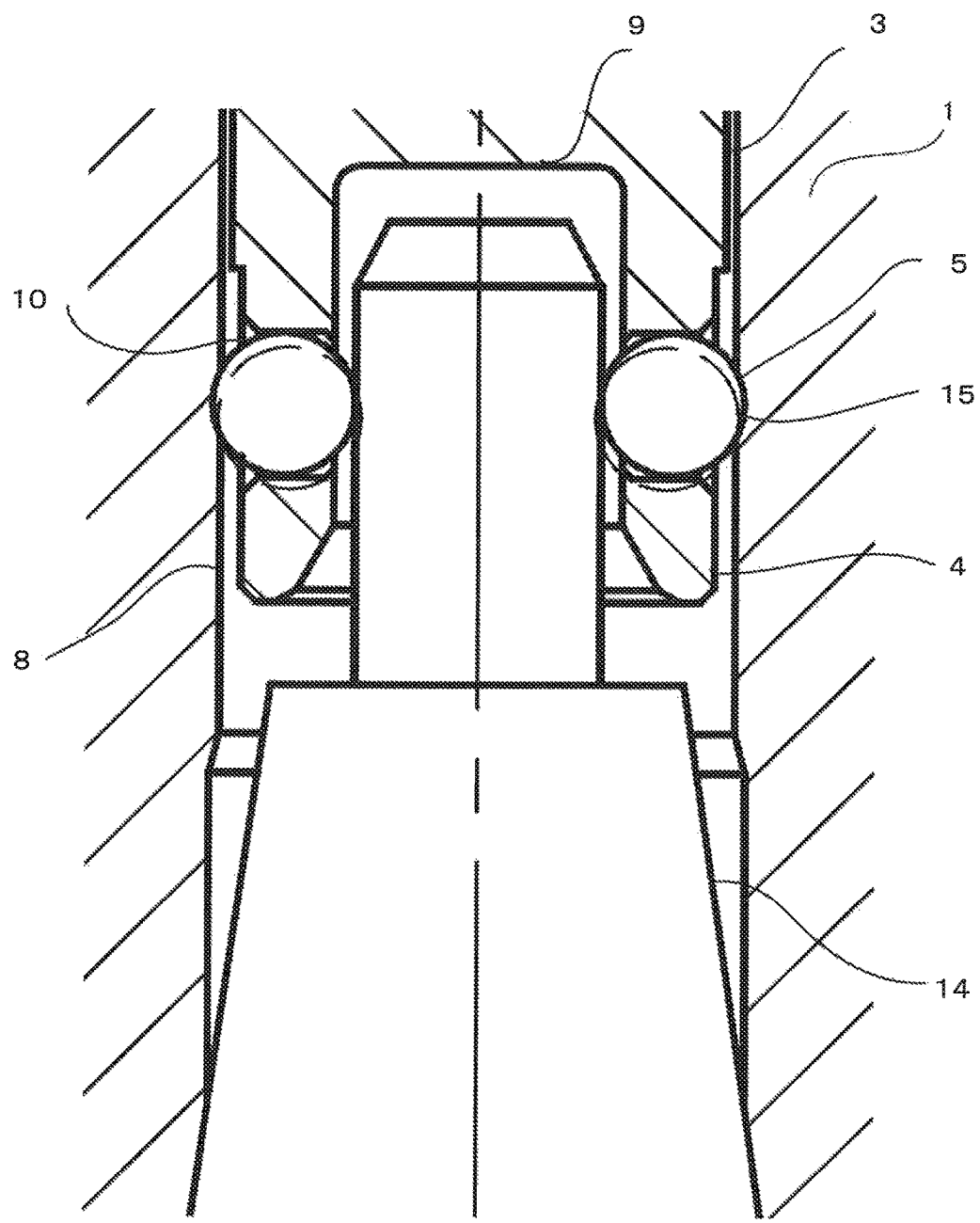
FIG. 3 is an explanatory drawing of a first embodiment of the tool clamping device according to the present invention, which is an enlarged view illustrating a positional relationship among parts when an impression is provided on the inner wall surface of the main shaft.

Referring to FIGS. 2 and 3, a first embodiment of a tool clamping device according to the present invention will be described below. FIG. 2 is an enlarged view of a part corresponding to the part A of the tool clamping device shown in FIG. 1.

As shown in FIG. 2, a main-shaft inner wall surface 8 on a main shaft 1 has an inclined surface formed by an impression 13. With this configuration, a pull stud 7 is fit into a concave portion 9 on a draw bar 3, and then the draw bar 3 is lifted by the force of a spring 2 (FIG. 1). This applies a force to an inclined surface 12 on the pull stud 7, steel balls 5, and an inclined surface formed by the impression 13 in the main shaft 1, whereupon a magnification effect is generated.

Referring to FIG. 3, a method of providing the impression 13 on the main-shaft inner wall surface 8 of the main shaft 1 will be described below.

FIG. 3 shows the positional relationship among the parts of the tool clamping device when the impression 13 is provided on the main-shaft inner wall surface 8 of the main shaft 1. The impression 13 is directly provided on the main-shaft inner wall surface 8 of the main shaft 1 by the draw bar 3 and the steel balls 5 that constitute the tool clamping device. The steel balls 5 are pressed onto the main-shaft inner wall surface 8 so as to form the impression 13 on the main-shaft inner wall surface 8 of the main shaft 1.

The phase of the axial rotation of the draw bar 3 is fixed with respect to the main shaft 1. As shown in FIG. 3, the draw bar 3 is first moved to a predetermined position, and then as shown in FIG. 3, a cylindrical jig 14 having a predetermined diameter is fit into the concave portion 9 provided on the end of the draw bar 3. The insertion of the cylindrical jig 14 into the concave portion 9 of the draw bar 3 presses the steel balls 5 to the main-shaft inner wall surface 8, thereby forming the impression 13 on the main-shaft inner wall surface 8.

At this point, the materials and hardness of the main-shaft inner wall surface 8 and the steel ball 5 can be optionally determined. For example, the material of the steel ball 5 is harder than that of the main-shaft inner wall surface 8 so that the steel balls 5 are pressed to form the impression 13 on the main-shaft inner wall surface 8. In such a method, a step of providing an impression on the main-shaft inner wall surface 8 can be incorporated in assembling the tool clamping device. This leads to a simple work so as to prevent an increase in the number of necessary man hours.

In this embodiment, the impression 13 is provided on the main-shaft inner wall surface 8 by the draw bar 3 and the steel balls 5 that constitute the tool clamping device, thereby forming the inclined surface on the main-shaft inner wall surface 8. Other methods may be selected for the provision of the impression 13.

In this embodiment, the position (phase) of the steel ball 5 is fixed and thus the impression 13 is provided only on a point in contact with the steel ball 5 on the main-shaft inner wall surface 8 so as to form an inclined surface on the main-shaft inner wall surface 8 (in this example, the impression 13 is not continuously formed along the circumference of the main-shaft inner wall surface 8). However, the impression 13 is not always formed by a single press of the steel ball 5. The impression 13 may be repeatedly provided on the main-shaft inner wall surface 8 with a varying phase of the steel ball 5 such that the impression 13 (FIG. 2) is finally shaped like a circle at a predetermined position (height) on the main-shaft inner wall surface 8. Alternatively, the impression 13 shaped like a wedge may be provided on the main-shaft inner wall surface 8 by other jigs.

Figure 4:
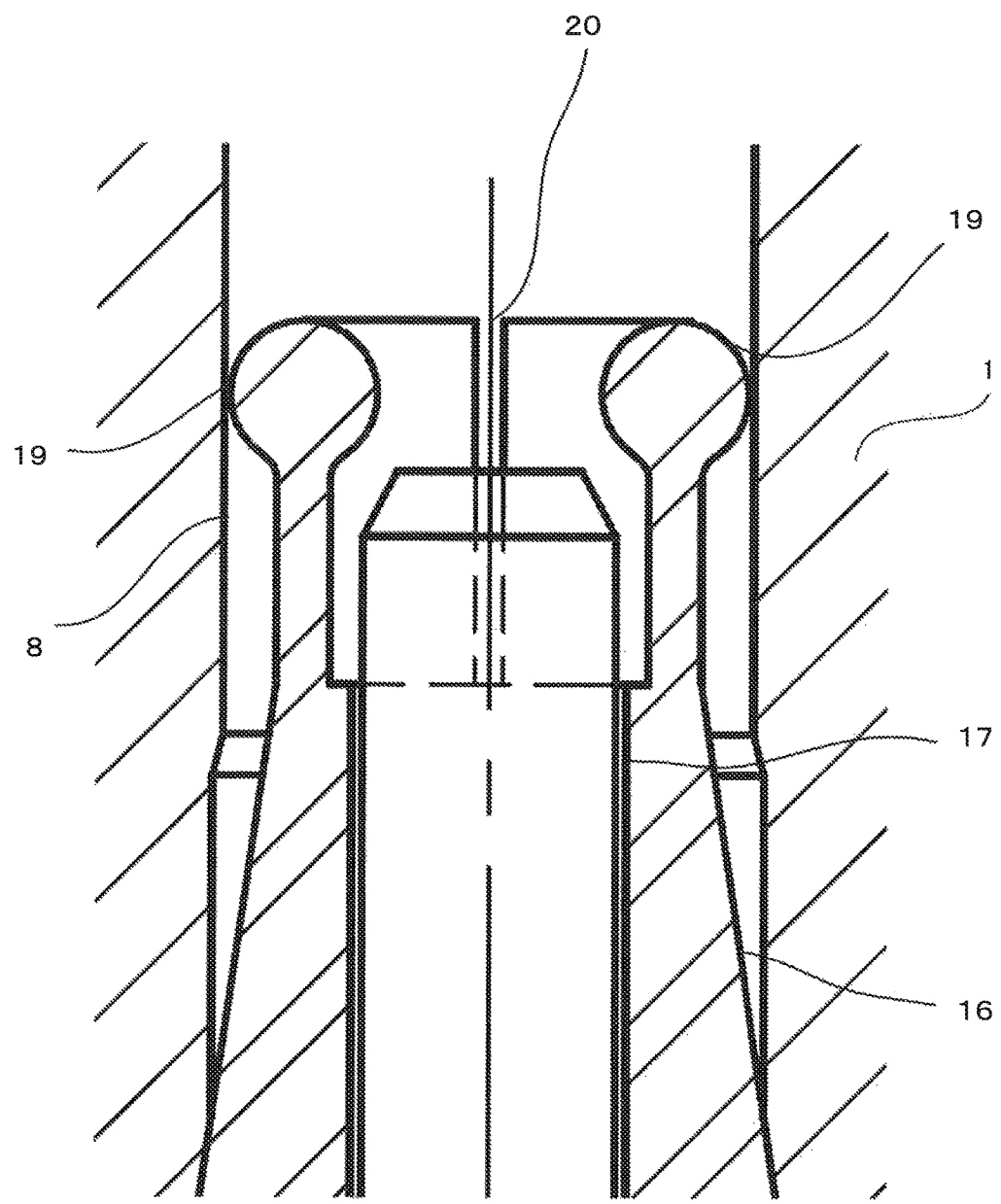
FIG. 4 is an explanatory drawing of a second embodiment of the tool clamping device according to the present invention, which is an enlarged view illustrating a positional relationship among parts when an impression is provided on the inner wall surface of the main shaft.
Figure 5:
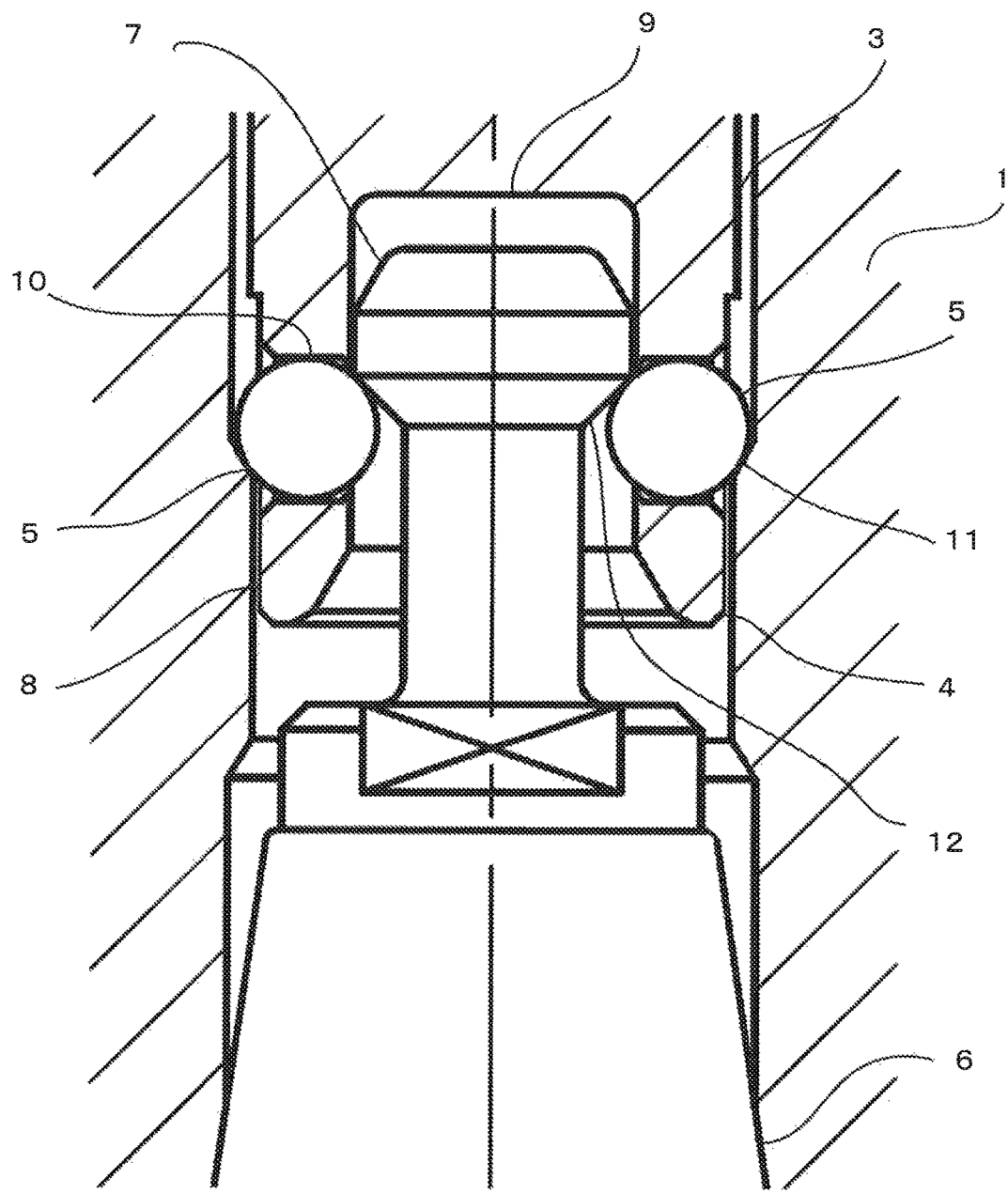
FIG. 5 is an enlarged view of a part A in FIG. 1 of the tool clamping device.

Referring to FIG. 4, a second embodiment of a tool clamping device according to the present invention will be described below. FIG. 4 is an enlarged view at a position corresponding to the part A of the clamping device illustrated in FIG. 1.

In this embodiment, a special jig is used to provide an impression 13 on a main-shaft inner wall surface 8. A first jig 16 has a hollow shape and is provided with a penetrator 19 on the end to provide the impression 13. The first jig 16 has a slot 20. The penetrator 19 is configured to extend outward when receiving an internal force.

The first jig 16 is inserted into a main shaft 1, and then a second jig 17 is inserted into the hollow part of the first jig 16 and is moved to the penetrator 19, causing the outer surface of the second jig 17 to press the penetrator 19 of the first jig 16 from the inside so as to extend the penetrator 19. The extended penetrator 19 strongly presses the main-shaft inner wall surface 8 so as to provide the impression 13 on the main-shaft inner wall surface 8.

In this embodiment, the impression 13 can be formed on the main-shaft inner wall surface 8 even if the draw bar 3 is not assembled into the main shaft 1.

The invention claimed is:

1. A tool clamping device for a machine tool, the tool clamping device comprising:
   a main shaft;
   a spring provided in the main shaft;
   a draw bar inserted into the main shaft so as to be opposed to the main shaft with the spring interposed between the main shaft and the draw bar, wherein the draw bar is provided with a concave portion on an end of the draw bar, and wherein the draw bar is movable in an axial direction of the main shaft;
   a steel ball provided around the end of the draw bar, wherein the steel ball is movable in a radial direction of the main shaft in response to a movement of the draw bar; and
   a main-shaft-side inclined surface defined by an impression on an inner wall of the main shaft, at a position where the steel ball is movable inward and outward in the radial direction;
   wherein
   a tool holder provided with a pull stud having a tool-holder-side inclined surface is attachable to the end of the draw bar;
   when the tool holder is attached to the end of the draw bar, the main-shaft-side inclined surface and the tool-holder-side inclined surface compose a magnification mechanism with the steel ball interposed therebetween,
   along the axial direction, the inner wall of the main shaft has first and second sections connected to opposite sides of the impression, and
   the impression extends outward, in the radial direction, from both the first and second sections of the inner wall of the main shaft.

2. The tool clamping device according to claim 1, wherein the impression is formed on the inner wall of the main shaft by inserting a cylindrical or prismatic jig that has a predetermined diameter in the concave portion of the draw bar and then pressing the steel ball by the inserted cylindrical or prismatic jig onto the inner wall of the main shaft to form the impression.

3. The tool clamping device according to claim 1, wherein the impression is formed on the inner wall of the main shaft by
   inserting an impression forming jig, that includes a jig body having a hollow part and a penetrator provided on an end of the jig body, in the main shaft, and inserting a cylindrical or prismatic jig in the hollow part of the impression forming jig so that the penetrator of the impression forming jig is pressed onto the inner wall of the main shaft to form the impression.

4. The tool clamping device according to claim 1, wherein the impression has a curved cross-section in a cross-section view taken along an axis of the main shaft.

5. The tool clamping device according to claim 1, wherein the impression has a shape of a part of a sphere.

6. The tool clamping device according to claim 1, wherein the impression is not continuously formed along a circumference of the inner wall of the main shaft.

* * * * *